United States Patent
Kim et al.

(10) Patent No.: US 6,684,016 B2
(45) Date of Patent: Jan. 27, 2004

(54) OPTICAL FIBER FOR WAVELENGTH DIVISION MULTIPLEXING OPTICAL TRANSMISSION SYSTEM USING DENSELY SPACED OPTICAL CHANNELS

(75) Inventors: Dae-weon Kim, Anyang Kyunggi-do (KR); Kwon-moo Lee, Seoul (KR); Dong-wook Lee, Pusan (KR); Dong-young Kim, Seoul (KR); Yun-chul Jung, Taejon metropolitan (KR)

(73) Assignee: LG Cable Ltd., Seoul (KR)

( * ) Notice: Subject to any disclaimer, the term of this patent is extended or adjusted under 35 U.S.C. 154(b) by 7 days.

(21) Appl. No.: 10/088,483

(22) PCT Filed: Mar. 31, 2001

(86) PCT No.: PCT/KR01/00547
§ 371 (c)(1),
(2), (4) Date: Jul. 15, 2002

(87) PCT Pub. No.: WO02/16970
PCT Pub. Date: Feb. 28, 2002

(65) Prior Publication Data
US 2002/0197036 A1 Dec. 26, 2002

(30) Foreign Application Priority Data
Aug. 25, 2000 (KR) ........................ 2000/49495

(51) Int. Cl.[7] ................................ G02B 6/02
(52) U.S. Cl. ................. 385/123; 385/124; 385/125; 385/126; 385/127
(58) Field of Search ................ 385/123, 124, 385/125, 126, 127

(56) References Cited

U.S. PATENT DOCUMENTS

| | | | |
|---|---|---|---|
| 4,691,991 A | | 9/1987 | Unger |
| 5,448,674 A | * | 9/1995 | Vengsarkar et al. ......... 385/123 |
| 5,802,234 A | * | 9/1998 | Vengsarkar et al. ......... 385/123 |
| 5,822,488 A | | 10/1998 | Terasawa et al. |
| 5,894,537 A | * | 4/1999 | Berkey et al. ............... 385/123 |
| 6,044,191 A | * | 3/2000 | Berkey et al. ............... 385/123 |
| 6,091,873 A | | 7/2000 | Matsuo et al. |
| 6,263,138 B1 | * | 7/2001 | Sillard et al. ............... 385/123 |

FOREIGN PATENT DOCUMENTS

| | | |
|---|---|---|
| EP | 0909964 A1 | 4/1999 |
| JP | 9-288220 | 11/1997 |
| JP | 11-119045 | 4/1999 |

* cited by examiner

Primary Examiner—Phan T. H. Palmer
Assistant Examiner—Jennifer Doan
(74) Attorney, Agent, or Firm—Nath & Associates PLLC; Harold L. Novick; Marvin C. Berkowitz

(57) ABSTRACT

Disclosed is an optical fiber having a desired dispersion value to sufficiently suppress a non-linearity phenomenon, that is, a four-wave mixing phenomenon, occurring at a channel spacing of 50 GHz while minimizing the expense consumed for a compensation for dispersion. The optical fiber satisfies optical characteristics defined by a dispersion value of 7 to 10 ps/nm-km at a wavelength of 1,550 nm, a zero dispersion wavelength of 1,450 nm or less, and a cut-off wavelength of 1,250 nm or less. The optical fiber includes a core having a desired diameter ($d_1$) and a desired refractive index ($n_1$), the cladding surrounding the core and having a refractive index ($n_{cl}$) less than the ($n_1$), of the core ($n_{cl}<n_1$) or ($n_2$) less than the outer cladding ($n_2<n_{cl}$). The ($n_2$) of the inner cladding may also be less than the ($n_1$) of the core and more than the ($n_{cl}$) of the outer cladding.

24 Claims, 13 Drawing Sheets

Time (ps)

Span Loss = 18 dB

OPTICAL FIBER FOR WAVELENGTH DIVISION MULTIPLEXING OPTICAL TRANSMISSION SYSTEM USING DENSELY SPACED OPTICAL CHANNELS

BACKGROUND OF THE INVENTION

1. Field of the Invention

The present invention relates to an optical fiber for a wavelength division multiplexing (WDM) optical transmission system, and more particularly to an optical fiber capable of suppressing influences, caused by a non-linearity of optical fibers, to a maximum in order to obtain a maximum transmission capacity per optical fiber. Also, the present invention relates to an optical fiber which can operate efficiently even when a reduced channel spacing is used for an increase in transmission capacity, while being usable even in a wavelength band of 1,450 to 1,530 nm called an "S-band" expected to be used in WDM optical transmission systems in future.

2. Description of the Related Art

Optical fibers can transmit a large quantity of data within a short period of time while involving a reduced transmission loss. The use of such optical fibers has been greatly increased in accordance with recent development of communications. In particular, optical transmission techniques have been remarkably advanced by virtue of development of a new optical fiber capable of transmitting signals for a long distance while involving a reduced signal loss, and development of a superior light source such as a semiconductor laser. In pace with such development of optical transmission techniques, techniques associated with optical fibers has been greatly advanced.

However, known optical fibers involve a chromatic dispersion, that is, a phenomenon that a signal is spread due to a difference in group velocity inverse to a variation in phase constant for different wavelength components of the signal, that is, different mode frequencies. Due to such a chromatic dispersion, a signal overlap occurs at the receiving terminal, thereby resulting in a fatal problem such as an impossibility of demodulation. For this reason, attempts to minimize such a chromatic dispersion (hereinafter, simple referred to as a "dispersion") have been made. By virtue of such attempts, it has been found that a zero dispersion is achieved at an operating wavelength of 1,310 nm.

Meanwhile, it has been found, on the basis of the relation between the total loss and the wavelength in an optical fiber, that a minimum signal loss is exhibited at a wavelength of 1,550 nm even though an increased dispersion occurs, as compared to that occurring at 1,310 nm. In this connection, the operating wavelength of 1,550 nm could be used by virtue of the development of a new optical amplifier capable of amplifying the wavelength band of 1,530 nm to 1,565 nm. As a result, a non-repeating long distance transmission has been possible. This has resulted in the advent of a dispersion-shifted fiber (DSF) adapted to shift the zero dispersion from the wavelength of 1,310 nm, at which the zero dispersion is achieved in conventional cases, to the wavelength of 1,550 nm in order to obtain a minimum dispersion and a minimum signal loss.

In addition to such a development of optical fibers, a WDM system has been developed, which serves to multiplex a plurality of optical signals having different wavelengths so as to simultaneously transmit those optical signals through a single optical fiber. Using such a WDM system, it is possible to more rapidly transmit an increased amount of data. An optical communication system using a WDM scheme at a wavelength of 1,550 nm has already been commercially available.

Where the above mentioned DSF is used in such a WDM optical transmission system, however, a signal distortion may occur even though a desired zero dispersion may be achieved. This is because the zero dispersion in the optical fiber may result in a non-linearity of the optical fiber, for example, a four-wave mixing in which lights of different wavelengths may be mixed together.

The most practical method usable in the WDM optical transmission system for a further increase in transmission capacity is to increase the number of channels used. In order to increase the number of channels used, however, it is necessary to use a reduced channel spacing because optical amplifiers use a limited amplification band. Such a reduced channel spacing may result in a more severe problem associated with the non-linearity of the optical fiber such as the four-wave mixing. The non-linearity of an optical fiber becomes more severe at a reduced channel spacing or a decreased dispersion of the optical fiber.

U.S. Pat. No. 5,327,516 discloses an optical fiber for a WDM system which exhibits a dispersion ranging from 1.5 ps/nm-km to 4 ps/nm-km at a wavelength of 1,550 nm in order to achieve a suppression in non-linearity. The optical fiber disclosed in this patent is called a "non-zero dispersion-shifted fiber (hereinafter, referred to as an "NZ-DSF") in that it is configured to obtain a non-zero dispersion. Such an optical fiber is commercially available from Lucent Technologies In., U.S.A.

The NZ-DSF is significant in that it can suppress the four-wave mixing phenomenon by virtue of its dispersion value ranging from 1.5 ps/nm-km to 4 ps/nm-km. However, the NZ-DSF disclosed in U.S. Pat. No. 5,327,516 insufficiently suppresses the four-wave mixing phenomenon occurring in current WDM systems using a channel spacing reduced from 200 GHz to 50 GHz via 100 GHz. For this reason, it is difficult for this NZ-DSF to be applied to a WDM long-distance optical transmission system using a narrow channel spacing of about 50 GHz.

FIG. 1 schematically illustrates an example of a WDM optical transmission system using NZ-DSFs.

The optical fiber system of FIG. 1 has 8 channels with a channel spacing of 50 GHz. This optical fiber system, which is denoted by the reference numeral 10, receives optical power of 0 dBm per channel from a light source. NZ-DSFs 14 are distributed over a total distance of 480 km. A dispersion compensation optical fiber (DCF) 15 is also arranged in every span, along with an optical amplifier 13. The detailed specification of the optical transfer system 10 illustrated in FIG. 1 is described in the following Table 1.

TABLE 1

| System Specification | Value |
| --- | --- |
| Data Transmission Rate | 10 Gb/s |
| Channel Spacing | 50 GHz |
| Optical Power | 0 dBm per channel |
| Number of Channels | 8 |
| Total Fiber Optic Cable Length | 480 km |
| Optical Amplifier Distribution Span Length | 80 km |
| Optical Fiber Loss | 0.2 dB/km |

The optical transmission system of FIG. 1 mainly includes eight transmitters (Tx) 11 respectively adapted to provide lights of different wavelengths, a multiplexer for multiplexing the lights of different wavelengths transmitted from the transmitting terminals 11, a plurality of optical amplifiers 13 each adapted to amplify a multiplexed light outputted from the multiplexer, a plurality of DCFs 15 each adapted to compensate for an amplified light outputted from an associated one of the optical amplifiers 13 arranged just upstream from the DCF 15, a demultiplexer for demultiplexing the light finally outputted after passing through the optical amplifiers 13 and DCFs 15, and a receiver (Rx) 12 for receiving the demultiplexed light from the demultiplexer. A plurality of NZ-DSFs 14 are distributed between the transmitters 11 and receiver 12. The optical amplifiers 13 are arranged so that each of them is spaced apart from an associated one of the NZ-DSFs 14 by a desired distance.

Each of the NZ-DSFs 14 used in the optical transmission system of FIG. 1 exhibits an average dispersion of 3.0 ps/nm-km. The average dispersion is a value obtained by dividing a dispersion value accumulated during the transmission of an optical signal by a transmission distance. Each NZ-DSF 14 exhibits an accumulated dispersion value of about 240 ps/nm at a point of 80 km. This accumulated dispersion value of each NZ-DSF 14 is compensated for by an associated one of the DCFs 15 each having a dispersion value of −240 ps/nm.

FIG. 2a is an eye diagram of an optical signal transmitted in the optical transmission system illustrated in FIG. 1.

As apparent from FIG. 2a, the eye of the optical signal is unclear, and partially opened. That is, the optical signal is in a severely degraded state. Such a signal degradation is mainly caused by a four-wave mixing phenomenon.

FIG. 2b illustrates the optical spectrum of an optical signal transmitted in the optical transmission system of FIG. 1.

Referring to FIG. 2b, it can be found that a signal spectrum not associated with the transmitted optical signal is generated at portions of the optical signal indicated by the arrow 35. Such a signal spectrum is generated due to a four-wave mixing phenomenon. Where a WDM optical transmission system using NZ-DSFs uses a narrow channel spacing of 50 GHz, its transmission quality is severely degraded due to a four-wave mixing phenomenon. This can be found by referring to FIG. 2b.

FIG. 3 illustrates respective variations in the Q-value, indicative of the communication quality, in the transmission system of FIG. 1 depending on the optical power inputted per channel at a channel spacing of 50 GHz in the cases where conventional NZ-DSFs are distributed over a distance of 320 km and a distance of 640 km, respectively.

It is generally known that when the Q-value is 16 dB or more, a bit error rate of $10^{-9}$ or less is obtained, at which there is no interference with communications. Referring to FIG. 3, it can be found that where the input optical power per channel generally used at 10 Gb/s is 3 dBm, the transmission system exhibits a Q-value of 16 dB or less in a long-distance transmission. That is, there is a severe signal degradation.

FIG. 4 illustrates an experimental system in which an experiment is conducted under the condition in which the input optical power per channel is 12 dBm, in order to determine a variation in four-wave mixing level depending on the channel spacing.

For the experiment conducted by the experimental system of FIG. 4, two optical fibers were used, one of which is a conventional NZ-DSF exhibiting a dispersion of 2.5 ps/km-nm at a wavelength of 1,550 nm while the other optical fiber being an optical fiber having characteristics described in the following Table 2. In the experiment, respective levels of four-wave mixing generated in the two optical fibers at various channel spacings are compared with each other.

TABLE 2

| Characteristics | Value |
| --- | --- |
| Dispersion Value (ps/nm-km) (at 1,550 nm) | 8.3 |
| Dispersion Slope (ps/nm²-km) | 0.055 |
| Effective Area ($\mu m^2$) | 53 |
| Cut-off Wavelength (nm) | 1,075 |
| Optical Loss (dB/km) (at 1,550 nm) | 0.21 |

FIG. 5a is a graph depicting a four-wave mixing generated in the conventional NZ-DSF at a channel spacing of 25 GHz with respect to a certain frequency band.

FIG. 5b is a graph depicting a four-wave mixing generated in the optical fiber increased in dispersion, as shown in Table 2, to reduce the four-wave mixing, with respect to the same frequency band as that in the case of FIG. 5a.

Referring to the comparison between FIGS. 5a and 5b, it can be found that the case of FIG. 5b exhibits a considerable reduction in the signal distortion resulting from the four-wave mixing (portions indicated by "FWM" in FIGS. 5a and 5b).

FIGS. 6a and 6b are graphs respectively depicting results obtained after the same experiments as those in the cases of FIGS. 5a and 5b are conducted at a channel spacing of 50 GHz.

Referring to the comparison between FIGS. 6a and 6b, it can be found that the case of FIG. 6b exhibits a considerable reduction in the signal distortion resulting from the four-wave mixing (portions indicated by "FWM" in FIGS. 6a and 6b).

Referring to FIGS. 5a, 5b, 6a, and 6b, it can be found that the conventional NZ-DSF inefficiently suppresses the four-wave mixing. It can also be found that the dispersion should be at least 8 ps/km-nm for an efficient suppression of the four-wave mixing.

FIG. 7 is a graph depicting variations in signal-to-noise ratio exhibited in respective cases using the conventional NZ-DSF and a 50 GHz NZ-DSF, depending on a variation in four-wave mixing resulting from a variation in channel spacing.

As shown in FIG. 7, the 50 GHz NZ-DSF effectively suppresses the four-wave mixing, as compared to the conventional NZ-DSF. In FIG. 7, each dot represents an experimental value whereas each line is a theoretical value. Referring to FIG. 7, it can be found that there is a considerable difference between the experimental and theoretical values. This difference results from noise other than the four-wave mixing. Where the channel spacing used in a WDM optical transmission system using the conventional NZ-DSF is reduced to 50 GHz for an increase in transmission capacity, therefore, it is impossible to transmit optical signals at a desired transmission quality due to a four-wave mixing phenomenon occurring due to the reduced channel spacing. This result causes a limitation on the maximum transmission capacity of the optical transmission system using the NZ-DSF. In this regard, where a WDM optical transmission system is desired to reduce the channel spacing to 50 GHz for an increase in the transmission capacity per optical fiber, it is important to develop an optical fiber having suppression characteristics for the four-wave mixing phenomenon, as compared to conventional NZ-DSFs.

The wavelength band mainly used in current WDM optical transmission systems is a wavelength range of 1,530 to 1,565 nm called a "C-band". Also, the wavelength range of 1,565 to 1,610 nm called a "L-band" is often used. One method for allowing optical transmission systems to have a large-scale capacity is to expand the operating wavelength range. For such an expansion of the operating wavelength range, it is necessary to develop an amplifier capable of amplifying light of a desired wavelength range. Currently, active research is being made in association with amplifiers capable of amplifying light of the S-band, that is, the wavelength range of 1,450 to 1,530 nm. It is known that optical amplifiers using an optical fiber made of glass based on fluoride and tellurite, and Raman amplifiers using a Raman scattering effect generated in an optical fiber are usable in the S-band.

Conventional NZ-DSFs cannot achieve an easy WDM optical transmission in the S-band because they exhibits a zero dispersion in the S-band, thereby resulting in an occurrence of the four-wave mixing phenomenon. To this end, it is necessary to develop an optical fiber having a certain dispersion value in the S-band so as to enable a WDM optical transmission even in the S-band, thereby meeting requirements involved in future optical transmission systems.

In order to allow optical transmission systems to have a large-scale capacity, therefore, it is urgently necessary to develop optical fibers capable of supporting both the 50 GHz channel spacing and the S-band, which cannot be simultaneously supported by conventional NZ-DSFs.

SUMMARY OF THE INVENTION

Therefore, an object of the invention is to solve the above mentioned problems involved in the related art, and to provide an optical fiber capable of being applied to a WDM optical transmission system using a reduced channel spacing while maximizing the transmission capacity per optical fiber in the WDM optical transmission system.

Another object of the invention is to provide an optical fiber having an appropriate dispersion value to sufficiently suppress a non-linearity phenomenon, that is, a four-wave mixing phenomenon, occurring at a channel spacing of 50 GHz while minimizing the expense consumed for a compensation for dispersion.

Another object of the invention is to provide an optical fiber exhibiting a zero dispersion wavelength of 1,450 or less, thereby being capable of achieving a WDM optical transmission in the S-band.

Another object of the invention is to provide an optical fiber exhibiting a desired dispersion value at a wavelength of 1,300 nm, expected to be used following the S-band, and a cut-off wavelength of 1,200 nm or less, thereby being capable of achieving a WDM optical transmission at the wavelength of 1,300 nm.

In order to accomplish these objects, the present invention provides an optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,550 nm, a zero dispersion wavelength of 1,450 nm or less, and a cut-off wavelength of 1,250 nm or less, and comprises a core having a desired diameter ($d_1$) and a desired refractive index ($n_1$), and a cladding made of a pure silica glass, the cladding surrounding the core and having a refractive index ($n_{cl}$) less than the refractive index ($n_1$) of the core ($nc_1 < n_1$).

An inner cladding having a desired diameter ($d_2$) may be interposed between the optical fiber and the cladding.

The inner cladding may have a refractive index ($n_2$) less than the refractive index ($n_{cl}$) of the outer cladding ($n_2 < n_{cl}$). In this case, the ratio between the diameter ($d_1$) of the core and the diameter ($d_2$) of the inner cladding ($d_1/d_2$) ranges from 0.3 to 0.8.

Alternatively, the refractive index ($n_2$) of the inner cladding may be less than the refractive index ($n_1$) of the core while being more than the refractive index ($n_{cl}$) of the outer cladding ($nc_1 < n_2 < n_{cl}$). In this case, the diameter ratio ($d_1/d_2$) ranges from 0.35 to 0.7.

BRIEF DESCRIPTION OF THE DRAWINGS

The above objects, and other features and advantages of the present invention will become more apparent after a reading of the following detailed description when taken in conjunction with the drawings, in which:

FIG. 5b is a graph depicting a four-wave mixing generated in the conventional NZ-DSF increased in dispersion, as shown in Table 2, to reduce the four-wave mixing, with respect to the same frequency hand as that in the case of FIG. 5a;

FIG. 8b is a dispersion curve of the optical fiber shown in FIG. 8a;

FIG. 9b is a dispersion curve of the optical fiber shown in FIG. 9a;

FIG. 10b is a dispersion curve of the optical fiber shown in FIG. 10a;

FIG. 12b is a dispersion curve of the optical fiber shown in FIG. 12a;

DESCRIPTION OF THE PREFERRED EMBODIMENTS

The present invention provides a single-mode optical fiber configured to transmit light in a wavelength range of 1,400 to 1,600 nm, in particular, at a wavelength of about 1,550 nm. This optical fiber includes a core serving to centrally concentrate light, and a cladding arranged around the core.

The optical fiber according to the present invention exhibits, at a wavelength of about 1,550 nm, a dispersion value of about 7 to 10 ps/nm-km and a dispersion slope of 0.04 to 0.06 ps/nm$^2$-km. The optical fiber also has an effective area of about 50 $\mu$m$^2$ or more, a zero dispersion wavelength of 1,450 nm or less, and a cut-off wavelength of 1,200 nm or less. The optical fiber of the present invention can minimize the distortion of a signal, transmitted therethrough, by virtue of an effective suppression for a four-wave mixing phenomenon occurring during the signal transmission conducted in a WDM fashion using a channel spacing of 50 GHz, while minimizing the expense consumed for a compensation for dispersion. Accordingly, the optical fiber of the present invention can easily secure an increased transmission capacity corresponding to about two times the transmission capacity provided by conventional NZ-DSFs used in association with the channel spacing of 100 GHz.

Figure 8A:
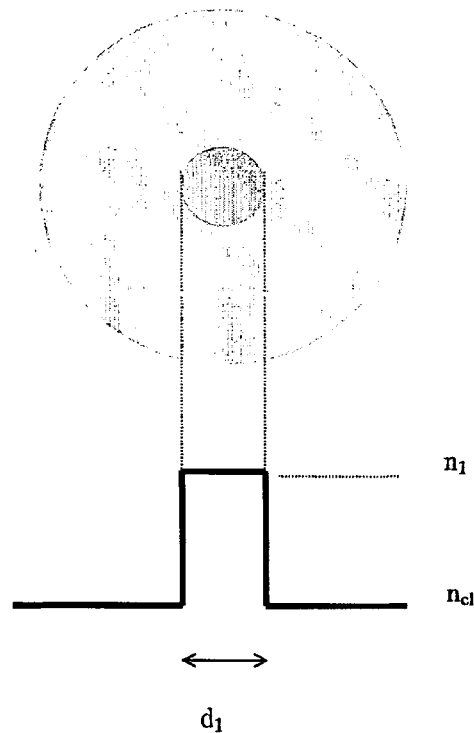
FIG. 8a illustrates the cross-sectional structure and refractive index distribution of an optical fiber according to an embodiment of the present invention.

FIG. 8a illustrates the cross-sectional structure and refractive index distribution of an optical fiber according to an embodiment of the present invention.

The optical fiber illustrated in FIG. 8a has a structure in which a core having a high refractive index is surrounded by a cladding having a low refractive index, so that the optical fiber has a single-stepped refractive index distribution. In the optical fiber structure of FIG. 8a, it is possible to obtain a dispersion value of 7 to 10 ps/nm-km at a wavelength of about 1,550 nm by appropriately adjusting the radius of the core and the refractive index distribution. In this regard, this optical fiber can suppress an undesirable phenomenon resulting from a non-linearity. In detail, the optical fiber according to the embodiment of FIG. 8a is a single-mode optical fiber made of silica glass. This optical fiber includes a core having a diameter, $d_1$, and a refractive index, $n_1$, and a cladding surrounding the core and having a refractive index, $n_{cl}$, less than the refractive index $n_1$ of the core ($n_{cl}<n_1$). The cladding is made of pure silica glass. This optical fiber exhibits a dispersion value of 7 to 10 ps/nm-km, a zero dispersion wavelength of 1,450 nm or less, and a cut-off wavelength of 1,250 nm or less, as characteristics at a wavelength of 1,550 nm. The core and the cladding exhibit a relative refractive index difference, $\Delta_1$, ($\Delta_1=(n_1-n_{cl})/n_{cl}\times100$) ranging from 0.43% to 0.5%, preferably from 0.44% to 0.49%, therebetween. The diameter $d_1$ of the core is 5.5 to 6.0 $\mu$m, preferably 5.7 $\mu$m to 5.9 $\mu$m. The optical fiber also has an effective area of 50 to 65 $\mu$m$^2$, preferably 59 $\mu$m$^2$ to 61 $\mu$m$^2$, and a dispersion slope corresponding to 0.055 ps/nm$^2$-km or less. Where the relative refractive index difference between the core and cladding, $\Delta_1$, is 0.447% ($\Delta_1=(n_1-n_{cl})/n_{cl}\times100=0.476(\%)$), and the core diameter $d_1$ corresponds to 5.77 $\mu$m, the optical fiber exhibits characteristics described in the following Table 3.

TABLE 3

| Characteristics | Value |
| --- | --- |
| Dispersion Value (ps/nm-km) (at 1,550 nm) | 9.0 |
| Dispersion Slope (ps/nm$^2$-km) | 0.051 |
| Effective Area ($\mu$m$^2$) | 56 |
| Zero Dispersion Wavelength (nm) | 1,390 |
| Cut-off Wavelength (nm) | 1,075 |

Figure 8B:
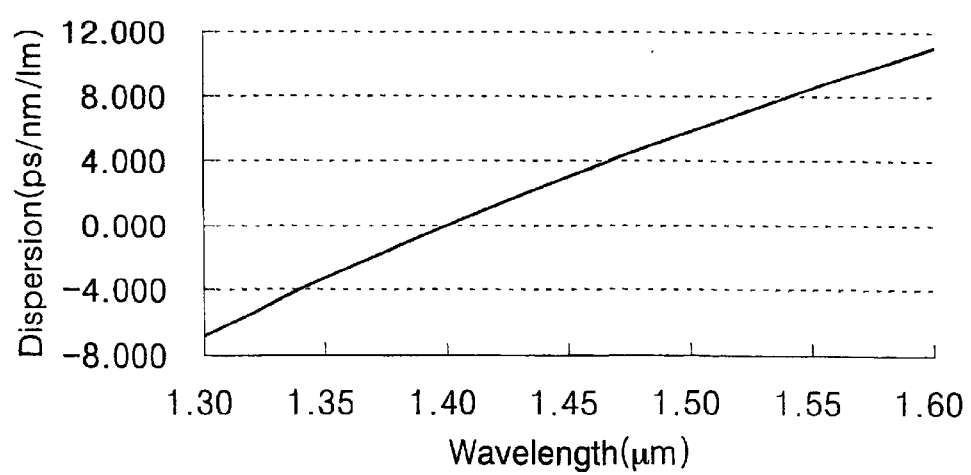

FIG. 8b is a dispersion curve of the optical fiber shown in FIG. 8a.

Referring to the characteristics described in Table 3, it can be found that the optical fiber according to the embodiment of FIG. 8a can be used for a WDM optical transmission using the channel spacing of 50 GHz. Referring to FIG. 8b, it can also be found that the optical fiber can be easily applied to WDM optical transmissions even in the S-band and at a wavelength of 1,300 nm.

Figure 9A:
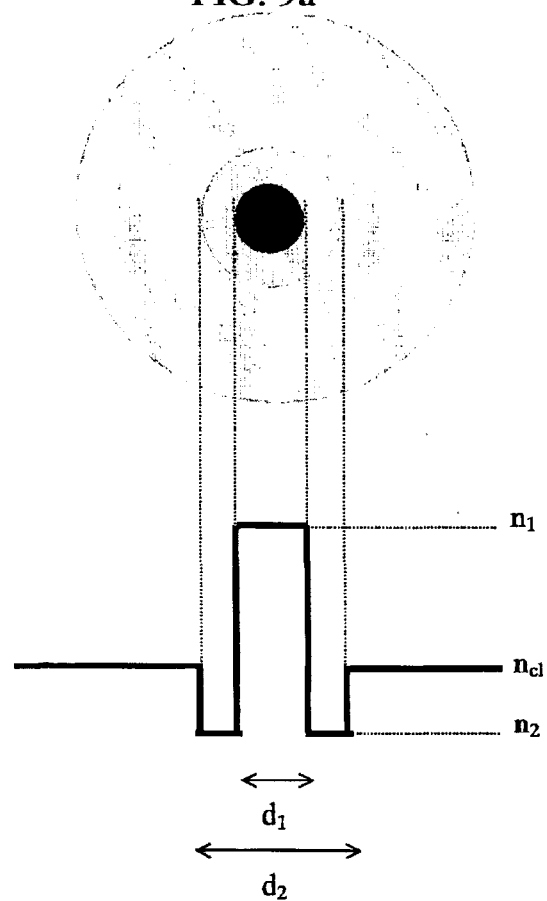
FIG. 9a illustrates the cross-sectional structure and refractive index distribution of an optical fiber according to another embodiment of the present invention.

FIG. 9a illustrates the cross-sectional structure of an optical fiber according to another embodiment of the present invention, and the refractive index distribution exhibited in a diametrical direction in the optical fiber.

Similar to the optical fiber of FIG. 8a, the optical fiber illustrated in FIG. 9a is easily applicable to the channel spacing of 50 GHz. This optical fiber has a structure including a core having a high refractive index, $n_1$, an inner cladding surrounding the core and having a refractive index, $n_2$, less than the refractive index $n_1$ of the core, and an outer cladding surrounding the inner cladding and having a refractive index, $n_{cl}$, less than the refractive index $n_1$ of the core while being more than the refractive index $n_2$ of the inner cladding ($n_2<n_{cl}<n_1$). The outer cladding is made of pure silica glass.

The optical fiber structure of FIG. 9a exhibits a dispersion value of 7 to 10 ps/nm-km, a dispersion slope of 0.06 ps/nm$^2$-km or less, preferably 0.055 ps/nm$^2$-km or less, a zero dispersion wavelength of 1,450 nm or less, an effective area of 54 $\mu$m$^2$ or more, preferably 55 to 65 $\mu$m$^2$, and more preferably 58 $\mu$m$^2$ to 63 $\mu$m$^2$, and a cut-off wavelength of 1,250 nm or less, preferably 1,200 nm or less, as characteristics at a wavelength of about 1,550 nm. The core and the outer cladding exhibit a relative refractive index difference ($\Delta_1$) ($\Delta_1=(n_1-n_{cl})/n_{cl}\times100$) ranging from 0.43% to 0.5%, preferably from 0.44% to 0.48%, therebetween whereas the inner and outer claddings exhibit a relative refractive index difference ($\Delta_2$) ($\Delta_2=(n_2-n_{cl})/n_{cl}\times100$) ranging from −0.07% to −0.01%, preferably from −0.04% to −0.03%, therebetween. The diameter $d_1$ of the core ranges from 5.7 $\mu$m to 6.3 $\mu$m, preferably from 5.9 $\mu$m to 6.1 $\mu$m, and the diameter $d_2$ of the inner cladding ranges from 10.0 $\mu$m to 13.0 $\mu$m, preferably 12.0 $\mu$m to 12.5 $\mu$m. The ratio between the diameter $d_1$ of the core and the diameter $d_2$ of the inner cladding, $d_1/d_2$, ranges from 0.3 to 0.8. In an example in which the relative refractive index difference between the core and outer cladding, $\Delta_1$, and the relative refractive index difference between the inner and outer claddings, $\Delta_2$, are 0.44% ($\Delta_1=(n_1-n_{cl})/n_{cl}\times100=0.47(\%)$) and −0.03% ($\Delta_2=(n_2-n_{cl})/n_{cl}\times100=-0.03(\%)$) respectively, and the diameter of the core, $d_1$, and the diameter of the inner cladding, $d_2$, correspond to 6.0 μm and 12.0 μm, the characteristics exhibited at a wavelength of 1,550 nm in the optical fiber are described in the following Table 4.

TABLE 4

| Characteristics | Value |
| --- | --- |
| Dispersion Value (ps/nm-km) (at 1,550 nm) | 8.5 |
| Dispersion Slope (ps/nm²-km) | 0.046 |
| Effective Area (μm²) | 60 |
| Zero Dispersion Wavelength (nm) | 1,390 |
| Cut-off Wavelength (nm) | 1,110 |

Figure 9B:
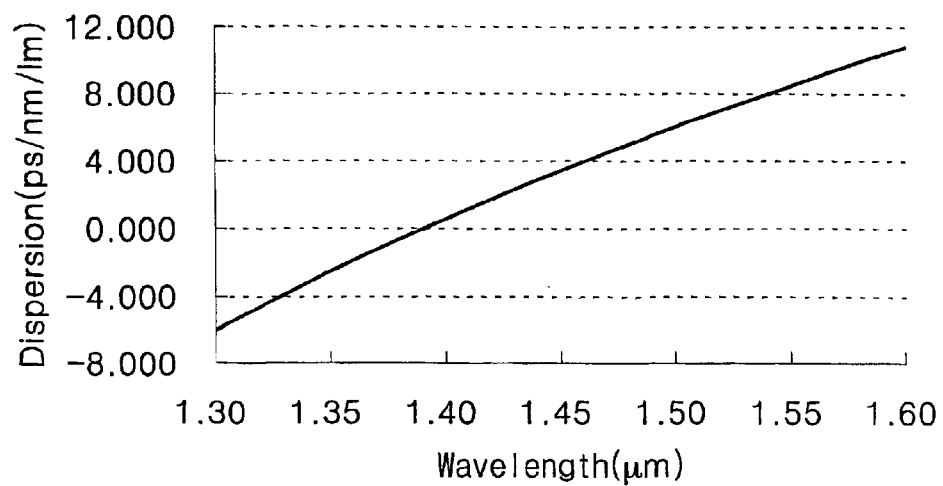

FIG. 9b is a dispersion curve of the optical fiber shown in FIG. 9a.

Referring to FIG. 9b, it can be found that the optical fiber of FIG. 9a can be easily applied to WDM optical transmissions even in the S-band and at a wavelength of 1,300 nm.

Figure 10A:
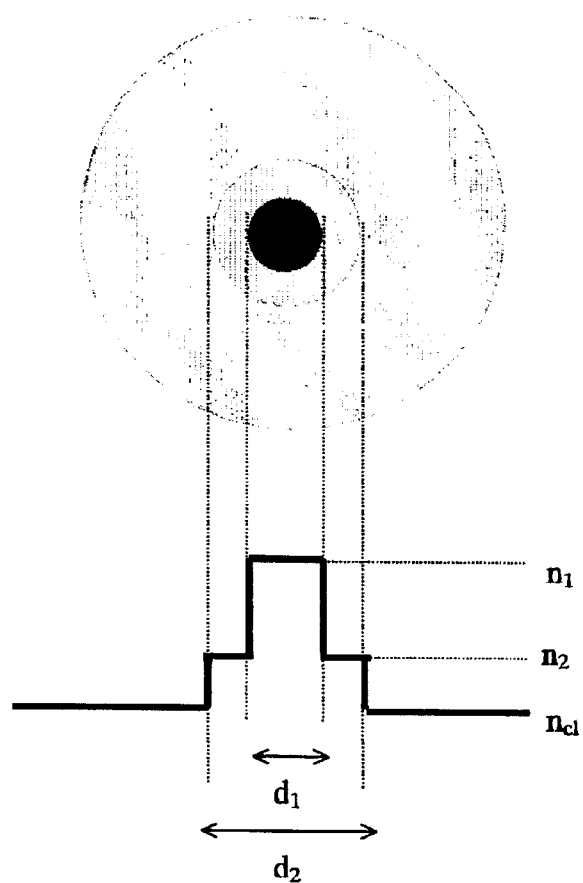
FIG. 10a illustrates the cross-sectional structure and refractive index distribution of an optical fiber according to another embodiment of the present invention.

FIG. 10a illustrates the cross-sectional structure of an optical fiber according to another embodiment of the present invention, and the refractive index distribution exhibited in a diametrical direction in the optical fiber.

Similar to the optical fibers according to the above mentioned embodiments of the present invention, the optical fiber illustrated in FIG. 10a is easily applicable to the channel spacing of 50 GHz. As shown in FIG. 10a, this optical fiber has a structure including a core having a high refractive index, $n_1$, an inner cladding surrounding the core and having a refractive index, $n_2$, less than the refractive index $n_1$ of the core, and an outer cladding surrounding the inner cladding and having a refractive index, $n_{cl}$, less than the refractive index $n_2$ of the inner cladding ($n_{cl}<n_2<n_1$). The outer cladding is made of pure silica glass.

The optical fiber structure of FIG. 10a exhibits a dispersion value of 7 to 10 ps/nm-km, a dispersion slope of 0.07 ps/nm²-km or less, preferably 0.04 to 0.06 ps/nm²-km, a zero dispersion wavelength of 1,450 nm or less, an effective area of 50 μm² to 60 μm², preferably 54 μm² to 65 μm², and a cut-off wavelength of 1,000 to 1400 nm, preferably 1,200 nm or less, as characteristics at a wavelength of about 1,550 nm. The core and the outer cladding exhibit a relative refractive index difference ($\Delta_1$) ($\Delta_1=(n_1-n_{cl})/n_{cl}\times100$) ranging from 0.49% to 0.55%, preferably from 0.51% to 0.54%, therebetween whereas the inner and outer claddings exhibit a relative refractive index difference ($\Delta_2$) ($\Delta_2=(n_2-n_{cl})/n_{cl}\times100$) ranging from 0.05% to 0.20%, preferably from 0.05% to 0.15%, therebetween. The diameter $d_1$ of the core ranges from 4.5 μm to 5.5 μm, preferably from 4.7 μm to 4.9 μm, and the diameter $d_2$ of the inner cladding ranges from 10.0 μm to 12.5 μm, preferably from 11.0 μm to 12.5 μm. The ratio between the diameter $d_1$ of the core and the diameter $d_2$ of the inner cladding, $d_1/d_2$, ranges from 0.35 to 0.7. In an example in which the relative refractive index difference between the core and outer cladding, $\Delta_1$, and the relative refractive index difference between the inner and outer claddings, $\Delta_2$, are 0.53% ($\Delta_1=(n_1-n_{cl})/n_{cl}\times100=0.53(\%)$) and 0.10% ($\Delta_2=(n_2-n_{cl})/n_{cl}\times100=0.10(\%)$), respectively, and the diameter of the core, $d_1$, and the diameter of the inner cladding, $d_2$, correspond to 4.8 μm and 11.6 μm, the characteristics exhibited at a wavelength of 1,550 nm in the optical fiber are described in the following Table 5.

TABLE 5

| Characteristics | Value |
| --- | --- |
| Dispersion Value (ps/nm-km) (at 1,550 nm) | 9.0 |
| Dispersion Slope (ps/nm²-km) | 0.063 |
| Effective Area (μm²) | 60 |
| Zero Dispersion Wavelength (nm) | 1,420 |
| Cut-off Wavelength (nm) | 1,185 |

Figure 10B:
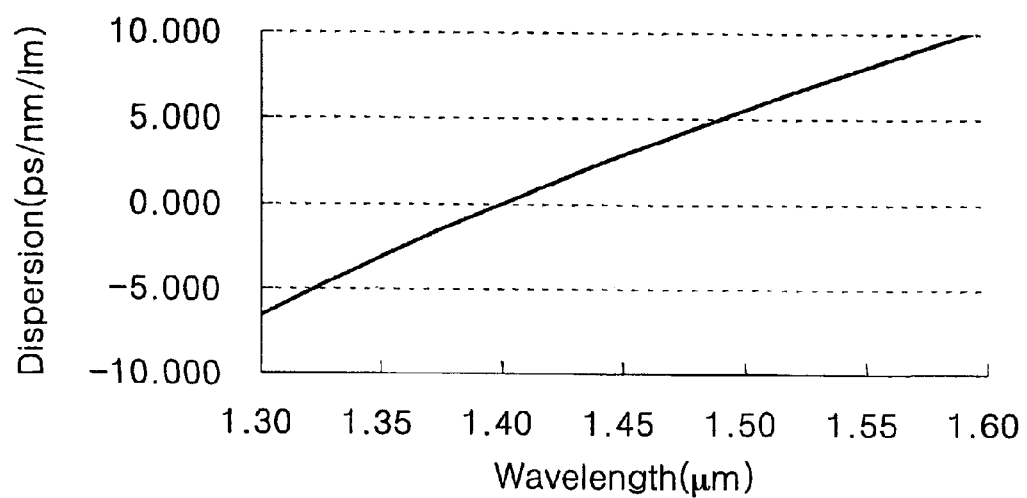

FIG. 10b is a dispersion curve of the optical fiber shown in FIG. 10a.

Referring to FIG. 10b, it can be found that the optical fiber of FIG. 10a can be easily applied to WDM optical transmissions even in the S-band and at a wavelength of 1,300 nm.

Figure 11A:
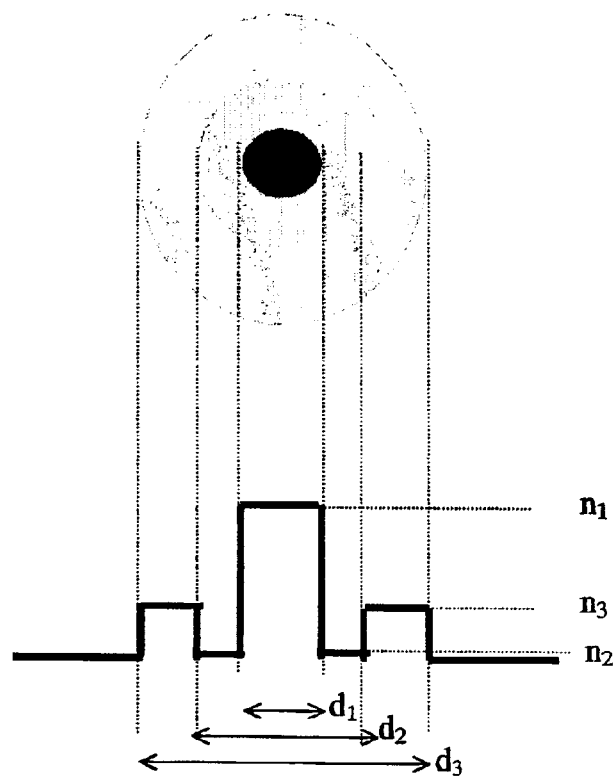
FIG. 11a illustrates the cross-sectional structure and refractive index distribution of an optical fiber according to another embodiment of the present invention.

FIG. 11a illustrates the cross-sectional structure of an optical fiber according to another embodiment of the present invention, and the refractive index distribution exhibited in a diametrical direction in the optical fiber.

Similar to the optical fibers according to the above mentioned embodiments of the present invention, the optical fiber illustrated in FIG. 11a is easily applicable to the channel spacing of 50 GHz.

As shown in FIG. 11a, this optical fiber has a structure including a core having a high refractive index, $n_1$, the first inner cladding surrounding the core and having a refractive index, $n_2$, same or higher than the refractive index $n_{cl}$ of the outer cladding and less than the refractive index $n_1$ of the core, the second inner cladding surrounding the first inner cladding and having a refractive index, $n_3$, higher than the refractive index $n_2$ of the first inner cladding and less than the refractive index $n_1$ of the core, and an outer cladding surrounding the second inner cladding and having a refractive index $n_{cl}$. The outer cladding is made of pure silica glass.

The optical fiber structure of FIG. 11a exhibits a dispersion value of 8 to 9 ps/nm-km, a dispersion slope of 0.050~0.065 ps/nm²-km, an effective area of 63 μm² to 70 μm² and a cut-off wavelength of 1,300 nm or less, as characteristics at a wavelength of about 1,550 nm. The core and the outer cladding exhibit a relative refractive index difference ($\Delta_1$) ($\Delta_1=(n_1-n_{cl})/n_{cl}\times100$) ranging from 0.41% to 0.47%, preferably from 0.42% to 0.465%, therebetween whereas the first inner and outer claddings exhibit a relative refractive index difference ($\Delta_2$) ($\Delta_2=(n_2-n_{cl})/n_{cl}\times100$) ranging from 0.0% to 0.06%, preferably from 0.0% to 0.04%, therebetween whereas the second inner and outer claddings exhibit a relative refractive index difference ($\Delta_3$) ($\Delta_3=(n_3-n_{cl})/n_{cl}\times100$) ranging from 0.015% to 0.2%, preferably from 0.018% to 0.18%, therebetween. The diameter $d_1$ of the core ranges from 5.5 μm to 6.5 μm, preferably from 5.5 μm to 6.2 μm, the diameter $d_2$ of the first inner cladding ranges from 12.0 μm to 16.0 μm, preferably from 13.0 μm to 15.4 μm, and the diameter $d_3$ of the second inner cladding ranges from 18.0 μm to 22.0 μm, preferably from 18.0 μm to 21.2 μm.

In an example in which the relative refractive index difference between the core and outer cladding, $\Delta_1$, the relative refractive index difference between the first inner and outer claddings, $\Delta_2$, and the relative refractive index difference between the second inner and outer claddings, $\Delta_3$, are 0.44% ($\Delta_1=(n_1-n_{cl})/n_{cl}\times100=0.44(\%)$), 0.02% ($\Delta_2=(n_2-n_{cl})/n_{cl}\times100=0.02(\%)$) and 0.12% ($\Delta_3=(n_3-n_{cl})/n_{cl}\times100=0.12(\%)$), respectively, and the diameter of the core, $d_1$, the diameter of the first inner cladding, $d_2$, and the diameter of the second inner cladding, $d_3$, correspond to 6.0 μm, 14.3 μm and 19.7 μm, the characteristics exhibited at a wavelength of 1,550 nm in the optical fiber are described in the following Table 6.

TABLE 6

| Characteristics | Value |
| --- | --- |
| Dispersion Value (ps/nm-km) (at 1,550 nm) | 8.5 |
| Dispersion Slope (ps/nm²-km) | 0.055 |
| Effective Area (μm²) | 67 |
| Zero Dispersion Wavelength (nm) | 1,410 |
| Cut-off Wavelength (nm) | <1,300 |

Figure 11B:
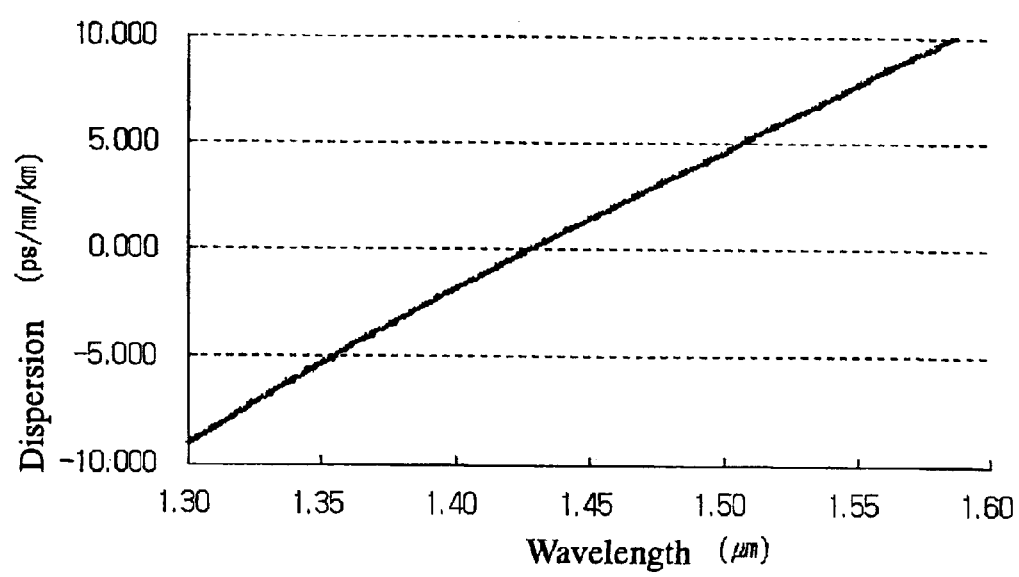
FIG. 11b is a dispersion curve of the optical fiber shown in FIG. 11.

FIG. 11b is a dispersion curve of the optical fiber shown in FIG. 11a.

Referring to FIG. 11b, it can be found that the optical fiber of FIG. 11a can be easily applied to WDM optical transmissions even in the S-band and at a wavelength of 1,300 nm.

Figure 12A:
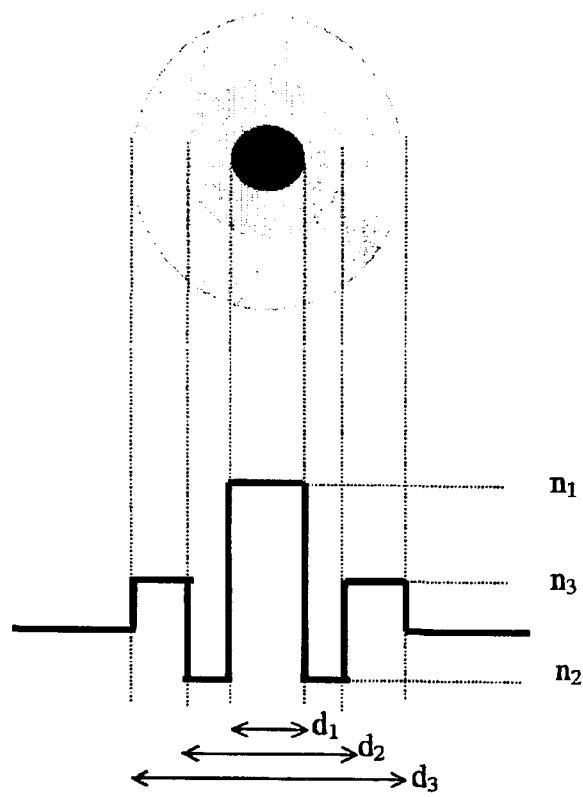
FIG. 12a illustrates the cross-sectional structure and refractive index distribution of an optical fiber according to another embodiment of the present invention.

FIG. 12a illustrates the cross-sectional structure of an optical fiber according to another embodiment of the present invention, and the refractive index distribution exhibited in a diametrical direction in the optical fiber.

Similar to the optical fibers according to the above mentioned embodiments of the present invention, the optical fiber illustrated in FIG. 12a is easily applicable to the channel spacing of 50 GHz. As shown in FIG. 12a, this optical fiber has a structure including a core having a high refractive index, $n_1$, the first inner cladding surrounding the core and having a refractive index, $n_2$, same or less than the refractive index $n_{cl}$ of the outer cladding and less than the refractive index $n_1$ of the core, the second inner cladding surrounding the first inner cladding and having a refractive index, $n_3$, higher than the refractive index $n_2$ of the first inner cladding and less than the refractive index $n_1$ of the core, and an outer cladding surrounding the second inner cladding and having a refractive index $n_{cl}$. The outer cladding is made or pure silica glass.

The optical fiber structure of FIG. 12a exhibits a dispersion value of 8 to 9 ps/nm-km, a dispersion slope of 0.060~0.063 ps/nm²-km, an effective area of 58 μm² to 63 μm² and a cut-off wavelength of 1,300 nm or less, as characteristics at a wavelength of about 1,550 nm. The core and the outer cladding exhibit a relative refractive index difference ($\Delta_1$) ($\Delta_1=(n_1-n_{cl})/n_{cl}\times 100$) ranging from 0.40% to 0.46%, preferably from 0.42% to 0.44%, therebetween whereas the first inner and outer claddings exhibit a relative refractive index difference ($\Delta_2$) ($\Delta_2=(n_2-n_{cl})/n_{cl}\times 100$) ranging from −0.15% to −0.07%, preferably from −0.09% to −0.06%, therebetween whereas the second inner and outer claddings exhibit a relative refractive index difference ($\Delta_3$) ($\Delta_3=(n_3-n_{cl})/n_{cl}\times 100$) ranging from 0.02% to 0.7%, preferably from 0.04% to 0.07%, therebetween. The diameter $d_1$ of the core ranges from 6.1 μm to 6.7 μm, preferably from 6.2 μm to 6.6 μm, the diameter $d_2$ of the first inner cladding ranges from 7.0 μm to 10.0 μm, preferably from 8.0 μm to 9.0 μm, and the diameter $d_3$ of the second inner cladding ranges from 18.5 μm to 22.5 μm, preferably from 20.0 μm to 21.0 μm. In an example in which the relative refractive index difference between the core and outer cladding, $\Delta_1$, the relative refractive index difference between the first inner and outer claddings, $\Delta_2$, and the relative refractive index difference between the second inner and outer claddings, $\Delta_3$, are 0.43% ($\Delta_1=(n_1-n_{cl})/n_{cl}\times 100=0.43(\%)$), −0.078% ($\Delta_2=(n_2-n_{cl})/n_{cl}\times 100=-0.078(\%)$) and 0.06% ($\Delta_3=(n_3-n_{cl})/n_{cl}\times 100=0.06(\%)$), respectively, and the diameter of the core, $d_1$, the diameter of the first inner cladding, $d_2$, and the diameter of the second inner cladding, $d_3$, correspond to 6.4 μm, 8.6 μm and 20.5 μm, the characteristics exhibited at a wavelength of 1,550 nm in the optical fiber are described in the following Table 7.

TABLE 7

| Characteristics | Value |
| --- | --- |
| Dispersion Value (ps/nm-km) (at 1,550 nm) | 8.5 |
| Dispersion Slope (ps/nm²-km) | 0.062 |
| Effective Area (μm²) | 61 |
| Zero Dispersion Wavelength (nm) | 1,420 |
| Cut-off Wavelength (nm) | <1,300 |

Figure 12B:
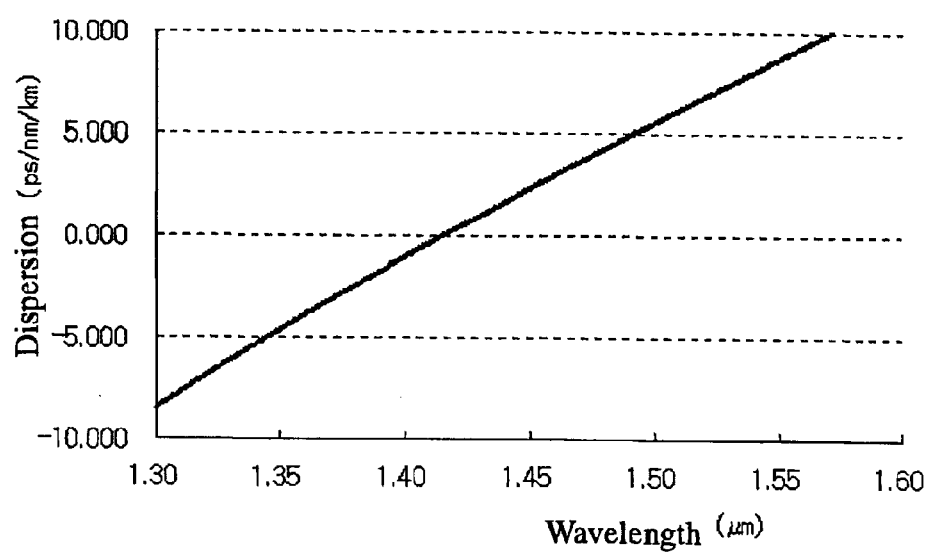

FIG. 12b is a dispersion curve of the optical fiber shown in FIG. 12a.

Referring to FIG. 12b, it can be found that the optical fiber of FIG. 12a can be easily applied to WDM optical transmissions even in the S-band and at a wavelength of 1,300 nm.

Figure 1:
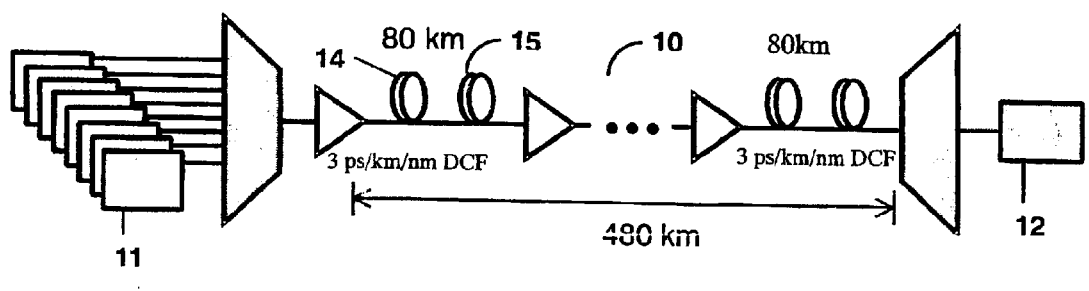
FIG. 1 is a schematic diagram illustrating a WDM optical transmission system using NZ-DSFs.
Figure 2A:
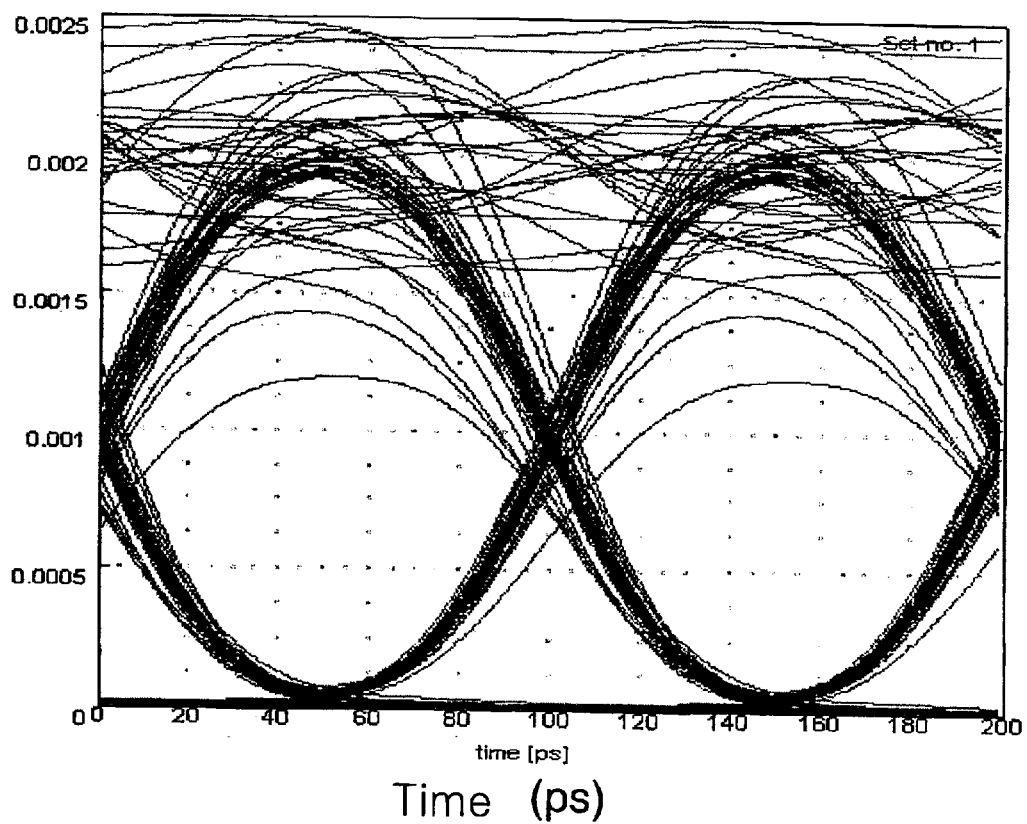
FIG. 2a is an eye diagram of an optical signal transmitted in the optical transmission system illustrated in FIG. 1.
Figure 2B:
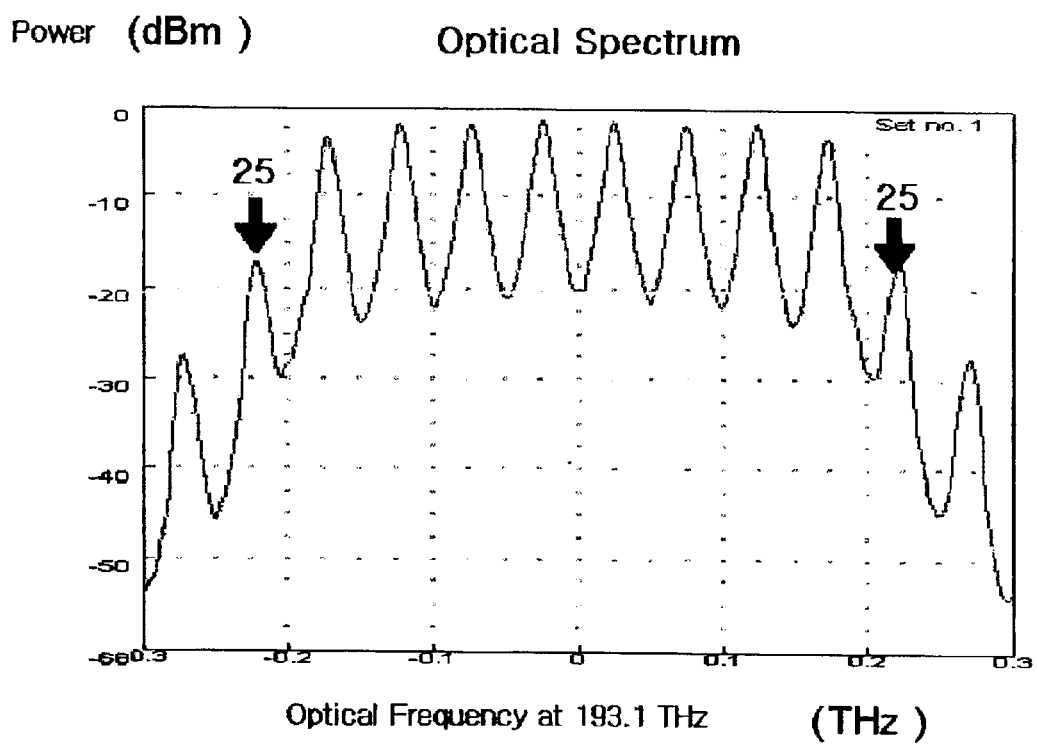
FIG. 2b is a diagram illustrating the optical spectrum of an optical signal transmitted in the optical transmission system of FIG. 1.
Figure 3:
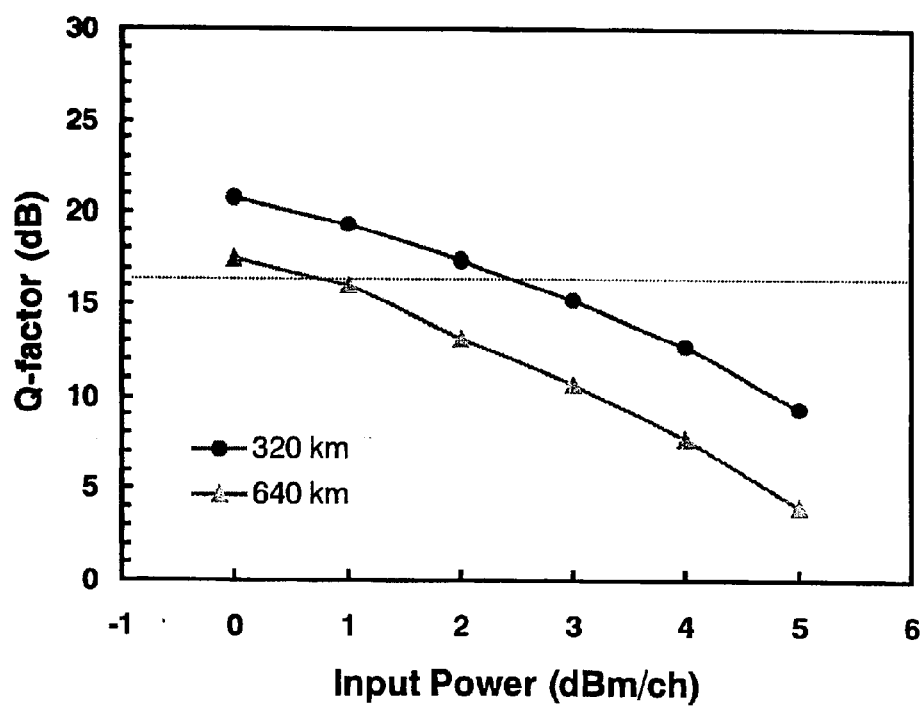
FIG. 3 is a graph depicting respective variations in the Q-value, indicative of the communication quality, in the transmission system of FIG. 1 depending on the optical power inputted per channel at a channel spacing of 50 GHz in the cases where conventional NZ-DSFs are distributed over a distance of 320 km and a distance of 640 km, respectively.
Figure 4:
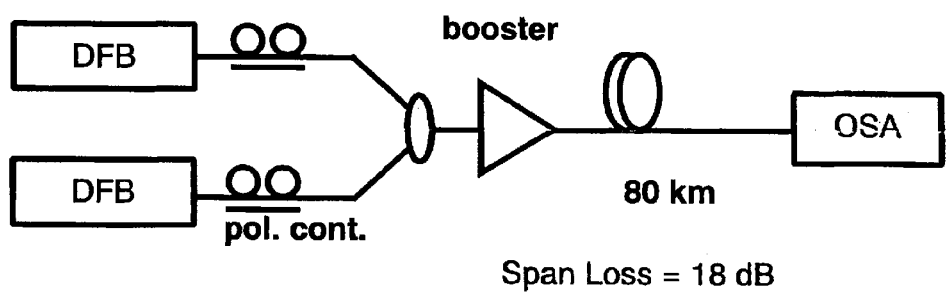
FIG. 4 is a schematic diagram illustrating an experimental system in which an experiment is conducted under the condition in which the input optical power per channel is 12 dBm, in order to determine a variation in four-wave mixing level depending on the channel spacing.
Figure 5A:
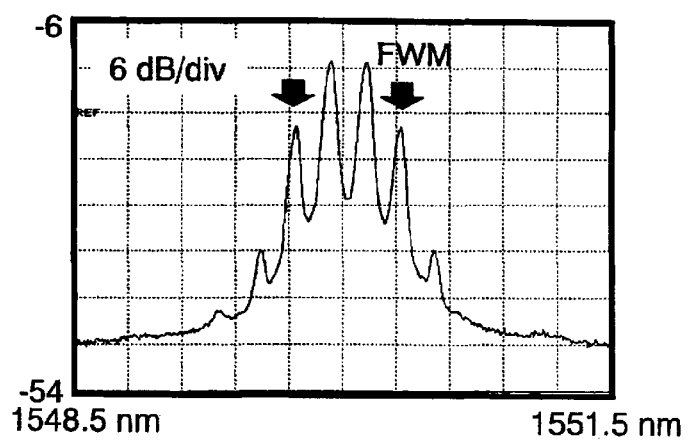
FIG. 5a is a graph depicting a four-wave mixing generated in a conventional NZ-DSF at a channel spacing of 25 GHz with respect to a certain frequency band.
Figure 5B:
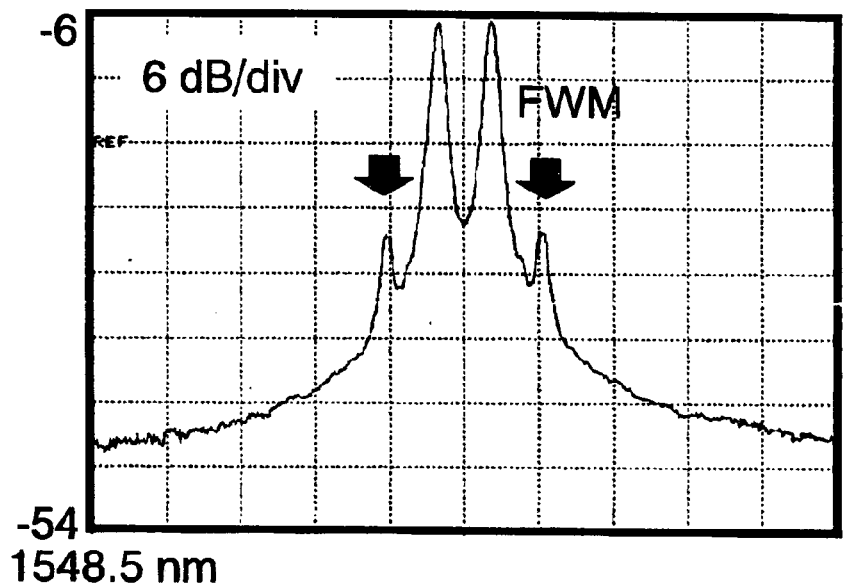
Figure 6A:
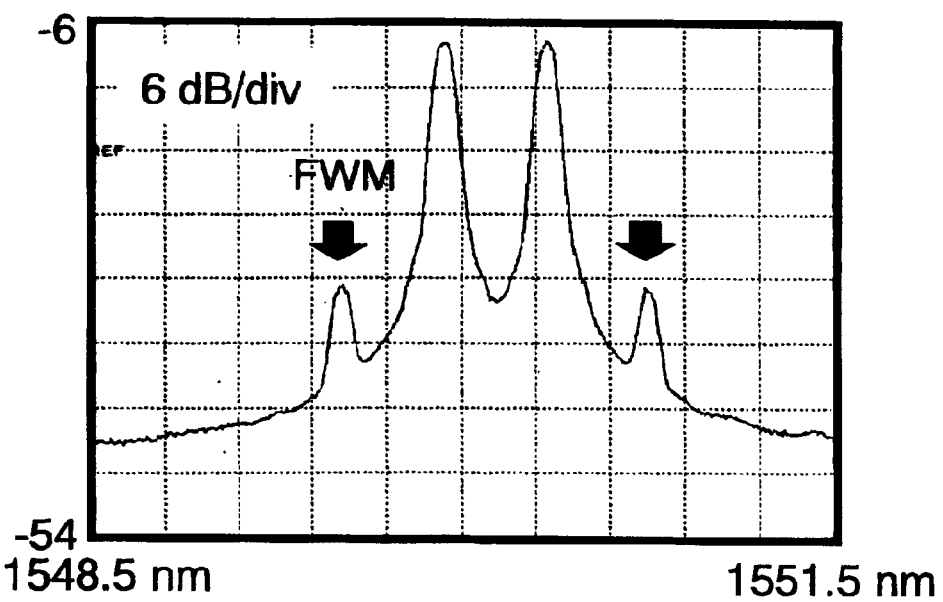
FIGS. 6a and 6b are graphs respectively depicting results obtained after the same experiments as those in the cases of FIGS. 5a and 5b are conducted at a channel spacing of 50 GHz.
Figure 6B:
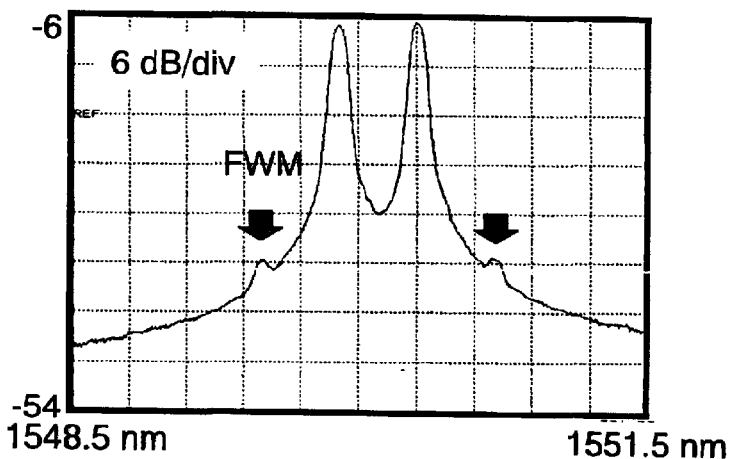
Figure 7:
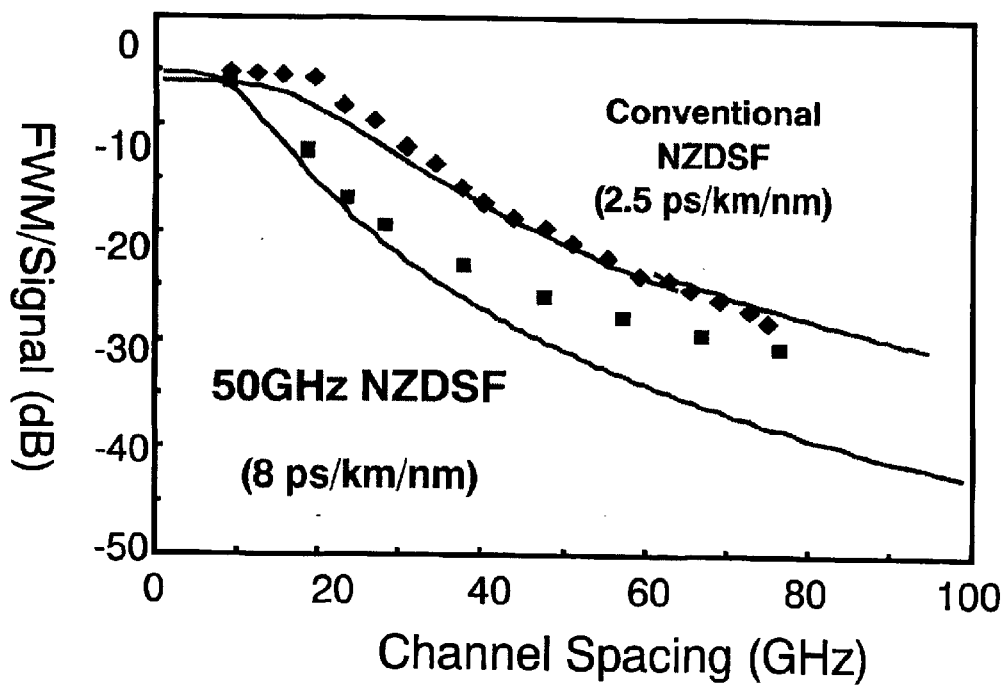
FIG. 7 is a graph depicting variations in signal-to-noise ratio depending on a variation in four-wave mixing resulting from a variation in channel spacing.
Figure 13:
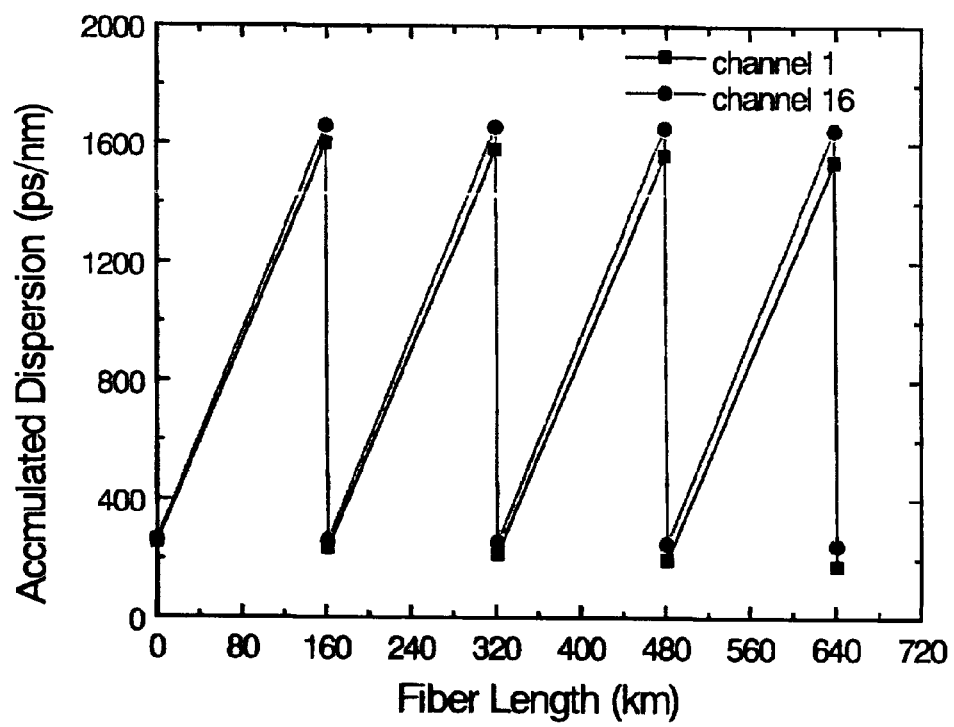
FIG. 13 is a graph depicting a variation in accumulated dispersion depending on the transmission length.

In order to evaluate the transmission characteristics of the optical fiber proposed by the present invention, an experiment was conducted under the condition in which the optical fiber was connected to an optical transmission system having a configuration as shown in FIG. 1. The optical fiber used in this experiment had characteristics as described in Table 2. The condition of the experiment is described in the following Table 8. The accumulated dispersion exhibited after the experiment is depicted in FIG. 13. FIG. 13 illustrates a variation in accumulated dispersion depending on the transmission length.

TABLE 8

| Conditions | Value |
| --- | --- |
| Data Transmission Rate | 10 Gb/s |
| Channel Spacing | 50 GHz |
| Optical Power | 2 dBm per channel |
| Number of Channels | 16 |
| Optical Amplifier Distribution Span Length | 80 km |
| Optical Fiber Loss | 0.21 dB/km |

Referring to FIG. 13, it can be found that there is no considerable difference resulting from a variation in channel in terms of the accumulated dispersion variation depending on the transmission length.

Figure 14A:
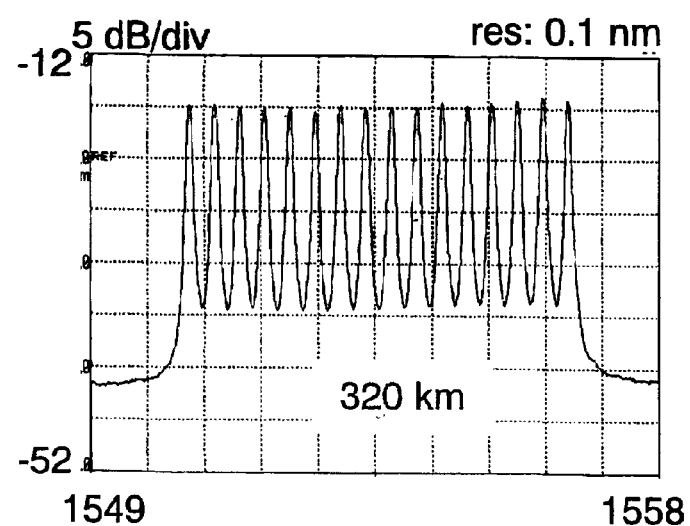
FIGS. 14a, 14b and 14c are waveform diagrams illustrating respective signal frequency characteristics of the optical fiber measured at different transmission lengths of 320 km, 480 km, and 640 km.
Figure 14B:
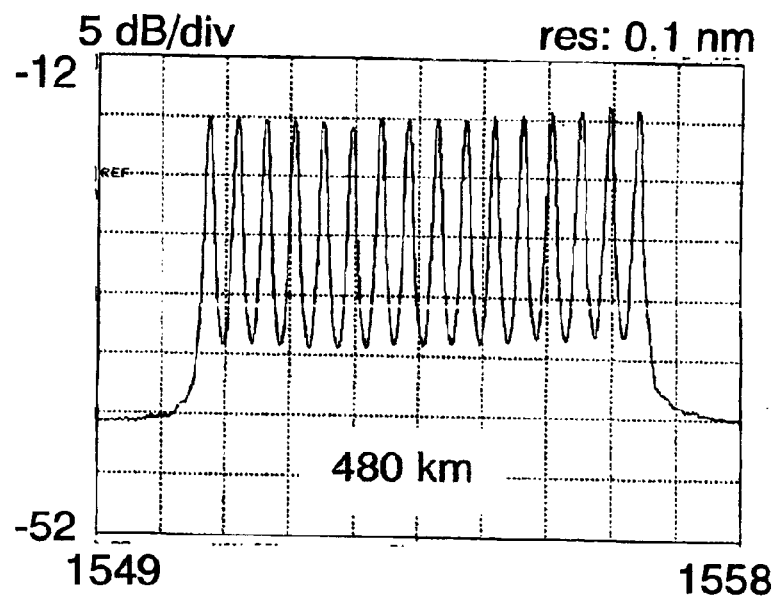
Figure 14C:
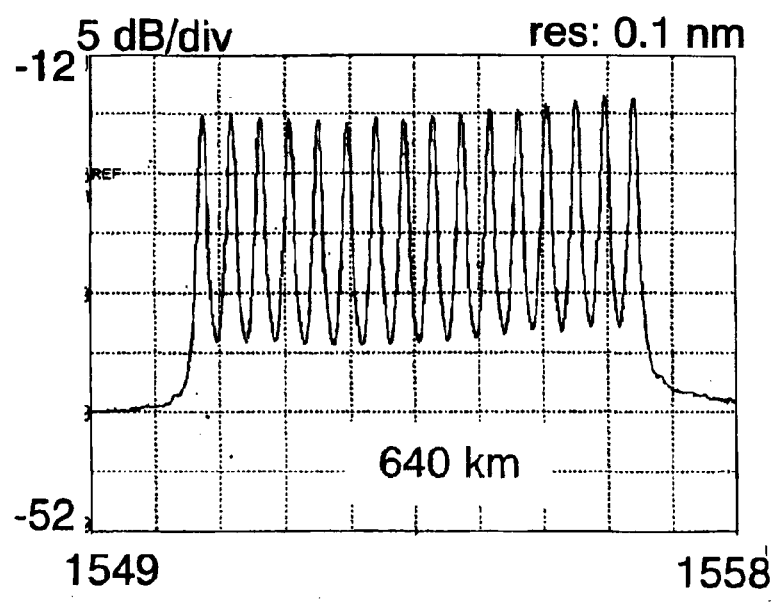

FIGS. 14a to 14c illustrate respective signal frequency characteristics of the optical fiber measured at different transmission lengths of 320 km, 480 km, and 640 km.

Referring to FIGS. 14a to 14c, it can be found that there is no or little four-wave mixing phenomenon occurring in the optical fiber according to the present invention.

Figure 15:
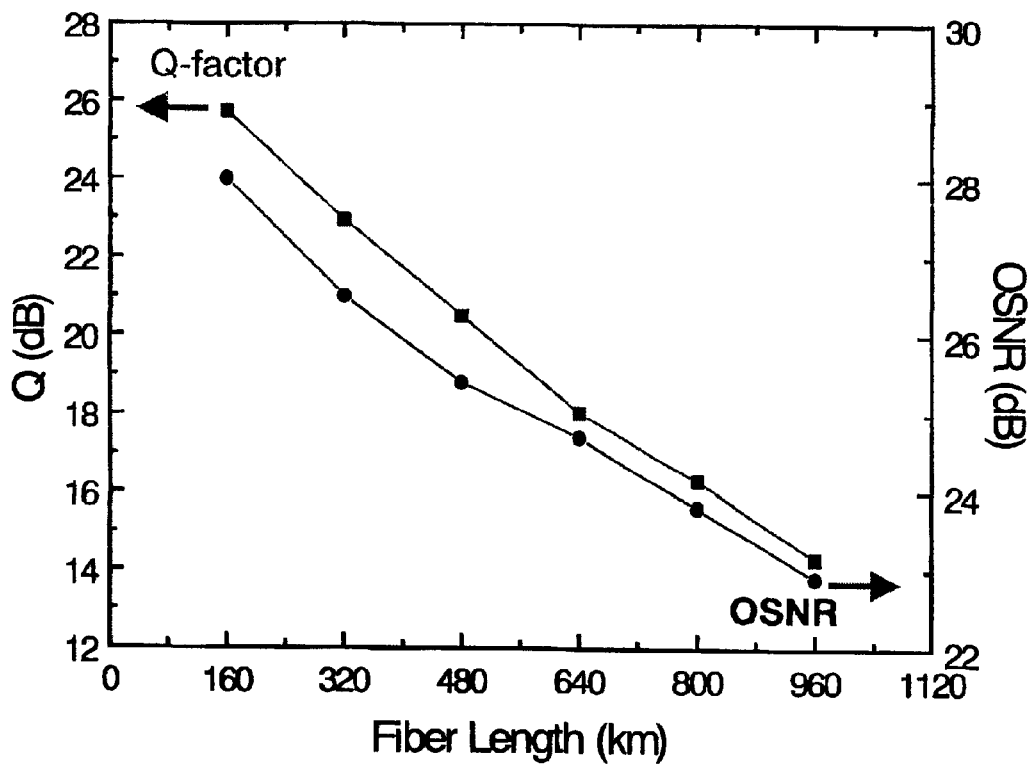
FIG. 15 is a graph illustrating a variation in Q-value exhibited at the 8th channel, depending on the transmission length.

FIG. 15 illustrates a variation in Q-value exhibited at the 8th channel, depending on the transmission length.

Referring to FIG. 15, it can he found that a Q-value of 16 dB or more is exhibited at a distance of about 800 km or less. This means that there is nor little influence on the communication quality in a long-distance transmission at a channel spacing of 50 GHz by virtue of a sufficient suppression for four-wave mixing.

As apparent from the above description, the present invention provides an optical fiber having an appropriate dispersion value to sufficiently suppress a non-linearity phenomenon, that is, a four-wave mixing phenomenon, occurring at a channel spacing of 50 GHz while minimizing the expense consumed for a compensation for dispersion.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,550 nm, a zero dispersion wavelength of 1,450 nm or less, and a cut-off wavelength of 1,250 nm or less, and comprises a core having a desired diameter ($d_1$) and a desired refractive index ($n_1$), and a cladding made of a pure silica glass, the cladding surrounding the core and having a refractive index ($n_{cl}$) less than the refractive index ($n_1$) of the core ($nc_1 < n_1$).

2. The optical fiber according to claim 1, wherein the core and the cladding exhibit a relative refractive index difference ($\Delta_1$) ($\Delta_1 = (n_1 - n_{cl})/n_{cl} \times 100$) ranging from 0.43% to 0.5% therebetween, and the diameter ($d_1$) of the core ranges from 5.5 µm to 6.0 µm.

3. The optical fiber according to claim 2, wherein the optical fiber has an effective area ranging from 50 µm² to 65 µm², and a dispersion slope corresponding to 0.055 ps/nm²-km or less.

4. The optical fiber according to claim 1, wherein the core and the cladding exhibit a relative refractive index difference ($\Delta_1$) ($\Delta_1 = (n_1 - n_{cl})/n_{cl} \times 100$) ranging from 0.44% to 0.49% therebetween, and the diameter ($d_1$) of the core ranges from 5.7 µm to 5.9 µm, and the optical fiber has an effective area ranging from 59 µm² to 61 µm² and a dispersion slope corresponding to 0.055 ps/nm²-km or less.

5. An optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,550 nm, a zero dispersion wavelength of 1,450 nm or less, and a cut-off wavelength of 1,250 nm or less, and comprises a core having a desired diameter ($d_1$) and a desired refractive index ($n_1$), an inner cladding surrounding the core and having a desired diameter ($d_2$) and a refractive index ($n_2$) less than the refractive index ($n_1$) of the core ($n_2 < n_1$), and an outer cladding made of a pure silica glass, the outer cladding surrounding the inner cladding and having a refractive index ($n_{cl}$) less than the refractive index ($n_1$) of the core while being more than the refractive index ($n_2$) of the inner cladding ($n_2 < n_{cl} < n_1$).

6. The optical fiber according to claim 5, wherein the core and the outer cladding exhibit a relative refractive index difference ($\Delta_1$) ($\Delta_1 = (n_1 - n_{cl})/n_{cl} \times 100$) ranging from 0.43% to 0.5% therebetween, the inner and outer claddings exhibit a relative refractive index difference ($\Delta_2$) ($\Delta_2 = (n_2 - n_{cl})/n_{cl} \times 100$) ranging from −0.07% to −0.01% therebetween, the diameter ($d_1$) of the core ranges from 5.7 µm to 6.3 µm, and the diameter ($d_2$) of the inner cladding ranges from 10.0 µm to 13.0 µm.

7. The optical fiber according to claim 6, wherein the optical fiber has an effective area ranging from 55 µm² to 65 µm², and a dispersion slope corresponding to 0.06 ps/nm²-km or less.

8. The optical fiber according to claim 5, wherein the core and the outer cladding exhibit a relative refractive index difference ($\Delta_1$) ($\Delta_1 = (n_1 - n_{cl})/n_{cl} \times 100$) ranging from 0.44% to 0.48% therebetween, the inner and outer claddings exhibit a relative refractive index difference ($\Delta_2$) ($\Delta_2 = (n_2 - n_{cl})/n_{cl} \times 100$) ranging from −0.04% to −0.03% therebetween, the diameter ($d_1$) of the core ranges from 5.9 µm to 6.1 µm, the diameter ($d_2$) of the inner cladding ranges from 12.0 µm to 12.5 µm, and the optical fiber has an effective area ranging from 58 µm² to 63 µm² and a dispersion slope corresponding to 0.055 ps/nm²-km or less.

9. The optical fiber according to claim 6, wherein the diameter ($d_1$) of the core is 5.5 to 6.5 µm, and the ratio between the diameter ($d_1$) of the core and the diameter ($d_2$) of the inner cladding ($d_1/d_2$) ranges from 0.3 to 0.8.

10. An optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,550 nm, a zero dispersion wavelength of 1,450 nm or less, and a cut-off wavelength of 1,250 nm or less, and comprises a core having a desired diameter ($d_1$) and a desired refractive index ($n_1$), an inner cladding surrounding the core and having a desired diameter ($d_2$) and a refractive index ($n_2$) less than the refractive index ($n_1$) of the core ($n_2 < n_1$), and an outer cladding made of a pure silica glass, the outer cladding surrounding the inner cladding and having a refractive index ($n_{cl}$) less than the refractive index ($n_2$) of the inner cladding ($n_{cl} < n_2$).

11. The optical fiber according to claim 10, wherein the core and the outer cladding exhibit a relative refractive index difference ($\Delta_1$) ($\Delta_1 = (n_1 - n_{cl})/n_{cl} \times 100$) ranging from 0.49% to 0.55% therebetween, the inner and outer claddings exhibit a relative refractive index difference ($\Delta_2$) ($\Delta_2 = (n_2 - n_{cl})/n_{cl} \times 100$) ranging from 0.05% to 0.20% therebetween, the diameter ($d_1$) of the core ranges from 4.5 µm to 5.5 µm, and the diameter ($d_2$) of the inner cladding ranges from 10.0 µm to 12.5 µm.

12. The optical fiber according to claim 11, wherein the optical fiber has an effective area ranging from 50 µm² to 60 µm², and a dispersion slope corresponding to 0.07 ps/nm²-km or less.

13. The optical fiber according to claim 10, wherein the core and the outer cladding exhibit a relative refractive index difference ($\Delta_1$) ($\Delta_1 = (n_1 - n_{cl})/n_{cl} \times 100$) ranging from 0.51% to 0.54% therebetween, the inner and outer claddings exhibit a relative refractive index difference ($\Delta_2$) ($\Delta_2 = (n_2 - n_{cl})/n_{cl} \times 100$) ranging from 0.05% to 0.15% therebetween, the diameter ($d_1$) of the core ranges from 4.7 µm to 4.9 µm, and the diameter ($d_2$) of the inner cladding ranges from 11.0 µm to 12.5 µm.

14. The optical fiber according to claim 11, wherein the diameter ($d_1$) of the core is 4.5 to 5.5 µm, and the ratio between the diameter ($d_1$) of the core and the diameter ($d_2$) of the inner cladding ($d_1/d_2$) ranges from 0.35 to 0.7.

15. An optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,550 nm, a zero dispersion wavelength of 1,440 nm or less, and a cut-off wavelength of 1,300 nm or less, and comprises a core having a desired diameter ($d_1$) and a desired high refractive index ($n_1$), the first inner cladding surrounding the core and having a desired diameter ($d_2$) and a refractive index ($n_2$) same or higher than a refractive index ($n_{cl}$) of an outer cladding and less than the refractive index ($n_1$) of the core ($n_{cl} \leq n_2 < n_1$) and, a second inner cladding surrounding the first inner cladding and having a desired diameter ($d_3$) and a refractive index ($n_3$) higher than the refractive index ($n_2$) of the first inner cladding ($n_2 < n_3$) and less than the refractive index ($n_1$) of the core ($n_1 \geq n_2$), and the outer cladding made of a pure silica glass, the outer cladding surrounding the inner cladding and having a refractive index ($n_{cl}$).

16. The optical fiber according to claim 15, wherein the core and the outer cladding exhibit a relative refractive index difference ($\Delta_1$) ($\Delta_1=(n_1-n_{cl})/n_{cl}\times 100$) ranging from 0.41% to 0.47% therebetween, the first inner and outer claddings exhibit a relative refractive index difference ($\Delta_2$) ($\Delta_2=(n_2-n_{cl})/n_{cl}\times 100$) ranging from 0.00% to 0.06% therebetween, the second inner and outer claddings exhibit a relative refractive index difference ($\Delta_3$) ($\Delta_3=(n_3-n_{cl})/n_{cl}\times 100$) ranging from 0.015% to 0.02% therebetween, the diameter ($d_1$) of the core ranges from 5.6 $\mu$m to 6.5 $\mu$m, the diameter ($d_2$) of the first inner cladding ranges from 12.0 $\mu$m to 16.0 $\mu$m and the diameter ($d_3$) of the second inner cladding ranges from 18.0 $\mu$m to 22.0 $\mu$m.

17. The optical fiber according to claim 16, wherein the optical fiber has an effective area ranging from 55 $\mu$m$^2$ to 80 $\mu$m$^2$, a dispersion slope corresponding to 0.07 ps/nm$^2$-km or less and cut-off wavelength corresponding to 1300 nm or less.

18. The optical fiber according to claim 16, wherein the care and the outer cladding exhibit a relative refractive index difference ($\Delta_1$) ($\Delta_1=(n_1-n_{cl})/n_{cl}\times 100$) ranging from 0.42% to 0.465% therebetween, the first inner and outer claddings exhibit a relative refractive index difference ($\Delta_2$) ($\Delta_2=(n_2-n_{cl})/n_{cl}\times 100$) ranging from 0.00% to 0.04% therebetween, the second inner and outer claddings exhibit a relative refractive index difference ($\Delta_3$) ($\Delta_3=(n_3-n_{cl})/n_{cl}\times 100$) ranging from 0.018% to 0.18% therebetween, the diameter ($d_1$) of the core ranges from 5.5 $\mu$m to 6.2 $\mu$m, the diameter ($d_2$) of the first inner cladding ranges from 13.0 $\mu$m to 15.4 $\mu$m and the diameter ($d_3$) of the second inner cladding ranges from 18.0 $\mu$m to 21.2 $\mu$m.

19. The optical fiber according to claim 18, wherein the optical fiber has an effective area ranging from 63 $\mu$m$^2$ to 70 $\mu$m$^2$, dispersion value 8~9 ps/nm-km, a dispersion slope corresponding to 0.07 ps/nm$^2$-km or less and cut-off wavelength corresponding to 1300 nm or less.

20. An optical fiber for a wavelength division multiplexing optical transmission system using a channel spacing of 50 GHz, wherein the optical fiber satisfies optical characteristics defined by a dispersion value of 7 to 10 ps/nm-km at a wavelength of 1,440 nm, and a cut-off wavelength of 1,300 nm or less, and comprises a core having a desired diameter ($d_1$) and a desired refractive index ($n_1$), a first inner cladding surrounding the core and having a desired diameter ($d_2$) and a refractive index ($n_2$) same or less than a refractive index ($n_{cl}$) of an outer cladding ($n_2 \leq n_{cl}$) and a second inner cladding surrounding the first inner cladding and having a desired diameter ($d_3$) and a refractive index ($n_3$) higher than the refractive index ($n_2$) of the first inner cladding ($n_2<n_3$), higher than the refractive index ($n_{cl}$) of the outer cladding ($n_{cl}<n_3$), and less than the refractive index ($n_1$) of the core ($n_1 \geq n_3$), and the outer cladding made of a pure silica glass, the outer cladding surrounding the inner cladding and having a refractive index ($n_{cl} \leq n_1$).

21. The optical fiber according to claim 20, wherein the core and the outer cladding exhibit a relative refractive index difference ($\Delta_1$) ($\Delta_1=(n_1-n_{cl})/n_{cl}\times 100$) ranging from 0.40% to 0.46% therebetween, the first inner and outer claddings exhibit a relative refractive index difference ($\Delta_2$) ($\Delta_2=(n_2-n_{cl})/n_{cl}\times 100$) ranging from −0.15% to −0.07% therebetween, the second inner and outer claddings exhibit a relative refractive index difference ($\Delta_3$) ($\Delta_3=(n_3-n_{cl})/n_{cl}\times 100$) ranging from 0.02% to 0.7% therebetween, the diameter ($d_1$) of the core ranges from 6.1 $\mu$m to 6.7 $\mu$m, the diameter ($d_2$) of the first inner cladding ranges from 7.0 $\mu$m to 10.0 $\mu$m and the diameter ($d_3$) of the second inner cladding ranges from 18.0 $\mu$m to 22.5 $\mu$m.

22. The optical fiber according to claim 21, wherein the optical fiber has an effective area ranging from 55 $\mu$m$^2$ to 65 $\mu$m$^2$, a dispersion slope corresponding to 0.065 ps/nm$^2$-km or less and cut-off wavelength corresponding to 1300 nm or less.

23. The optical fiber according to claim 20, wherein the core and the outer cladding exhibit a relative refractive index difference ($\Delta_1$) ($\Delta_1=(n_1-n_{cl})/n_{cl}\times 100$) ranging from 0.42% to 0.44% therebetween, the first inner and outer claddings exhibit a relative refractive index difference ($\Delta_2$) ($\Delta_2=(n_2-n_{cl})/n_{cl}\times 100$) ranging from −0.09% to −0.06% therebetween, the second inner and outer claddings exhibit a relative refractive index difference ($\Delta_3$) ($\Delta_3=(n_3-n_{cl})/n_{cl}\times 100$) ranging from 0.04% to 0.07% therebetween, the diameter ($d_1$) of the core ranges from 6.2 $\mu$m to 6.6 $\mu$m, the diameter ($d_2$) of the first inner cladding ranges from 8.0 $\mu$m to 9.0 $\mu$m and the diameter ($d_3$) of the second inner cladding ranges from 20.0 $\mu$m to 21.2 $\mu$m.

24. The optical fiber according to claim 13, wherein the optical fiber has an effective area ranging from 58 $\mu$m$^2$ to 63 $\mu$m$^2$, dispersion value 8~9 ps/nm-km, a dispersion slope corresponding to 0.063 ps/nm$^2$-km or less and cut-off wavelength corresponding to 1300 nm or less.

* * * * *